Figure 1:
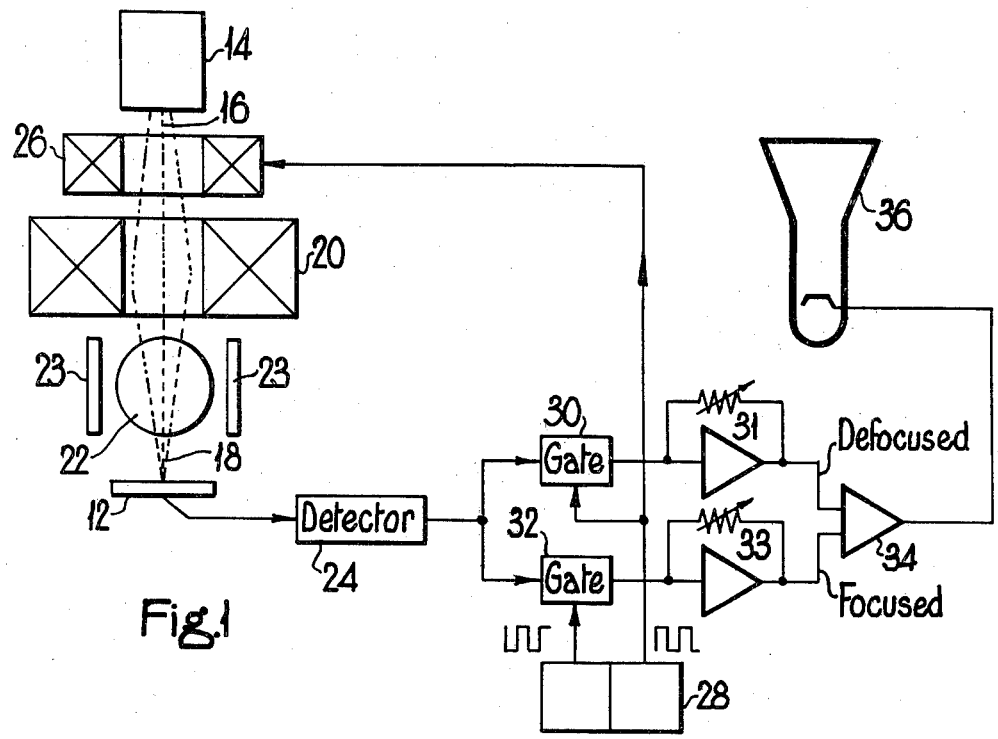

United States Patent [19]
Banbury

[11] 3,919,550
[45] Nov. 11, 1975

[54] SCANNING ELECTRON MICROSCOPES

[75] Inventor: John Randolph Banbury, Hale, England

[73] Assignee: Associated Electrical Industries Limited, London, England

[22] Filed: June 17, 1974

[21] Appl. No.: 480,148

[30] Foreign Application Priority Data
June 16, 1973 United Kingdom............... 28998/73

[52] U.S. Cl.................................. 250/311; 250/397
[51] Int. Cl.²...................... G01N 23/00; G21K 7/00; H01K 37/26
[58] Field of Search ........... 250/311, 307, 309, 310, 250/396, 397

[56]            References Cited
         UNITED STATES PATENTS
3,678,384    7/1972    Oatley........................... 250/310 X
3,748,467    7/1973    Suganuma.......................... 250/311

Primary Examiner—James W. Lawrence
Assistant Examiner—T. N. Grigsby
Attorney, Agent, or Firm—Watts, Hoffmann, Fisher & Heinke Co.

[57]            ABSTRACT

A scanning electron microscope in which the electron probe is alternately focused and defocused as it scans the specimen. The value of the detected electron current during the defocused phases is proportional to the total beam current, and hence serves as a reference for correcting the value during the focused phases. In this way, intensity variations due to fluctuations in the beam current are substantially eliminated.

19 Claims, 2 Drawing Figures

SCANNING ELECTRON MICROSCOPES

This invention relates to scanning electron microscopes.

In a typical scanning electron microscope, a specimen is scanned with a fine probe of electrons, electrons that are transmitted through the specimen being collected by an electron detector to provide an output signal. This output signal is used to modulate the beam of a cathode ray tube which is scanned in synchronism with the probe, so as to cause the cathode ray tube to display a pattern which depends on the structure of the scanned portion of the specimen. Alternatively, instead of collecting transmitted electrons, secondary radiation (e.g., electrons or X-rays), emitted from the specimen as a result of bombardment by the electrons of the probe, may be detected to provide an output signal.

In such a microscope, the electron probe must be very fine, such as to illuminate only a small region of the specimen, in order to enable small features of the specimen to be examined. Production of a fine probe requires an electron source having a very small electron-emitting area such as, for example, a field-emission electron source. However, such sources can suffer from poor emission current stability because of the very small area from which the current is drawn; that is to say, the electron current drawn from such a source tends to fluctuate with time, even although the operating conditions of the source are maintained constant. This results in a degradation of the quality of the image displayed on the cathode ray tube, especially if the microscope is used in a single-shot mode, i.e., forming an image from only a single scan of the probe over the specimen for recording photographically.

At first sight, it would appear that this problem could be overcome by feedback control of the emission current from the electron source, using current collected from an aperture in the path of the probe as a measure of the probe current. However, the current collected from such an aperture is not an exact measure of the probe current and is not sufficiently exact to provide an accurately stabilized source. Moreover, controlling the current emitted from the electron source tends to disturb the electron optical properties of the source and therefore to cause some change in the virtual source size and position, thus increasing the effective aberrations of the system and reducing the available source brightness.

One object of the present invention, therefore, is to provide a scanning electron microscope in which the problem of electron probe stability is alleviated.

According to the present invention, there is provided a scanning electron microscope including an electron source for producing an electron probe directed towards a specimen; means for scanning said probe in a predetermined pattern relative to the specimen; detector means for collecting radiation issuing from said specimen as a result of scanning by said probe to produce an output signal representing the instantaneous magnitude of said radiation; means for alternately focusing and defocusing said probe to illuminate alternately a relatively small region of the specimen and a relatively extended region of the specimen, thereby causing said output signal to alternate between a focused value, which depends on the nature of the small region currently being scanned by the probe as well as on the total electron current of said probe, and a defocused value, which depends on the total electron current of said probe but is substantially independent of the scanning of said probe; and means for processing together successive focused and defocused values of said output signal so as to substantially compensate said focused value for variations in the total electron current of said probe.

Figure 2:
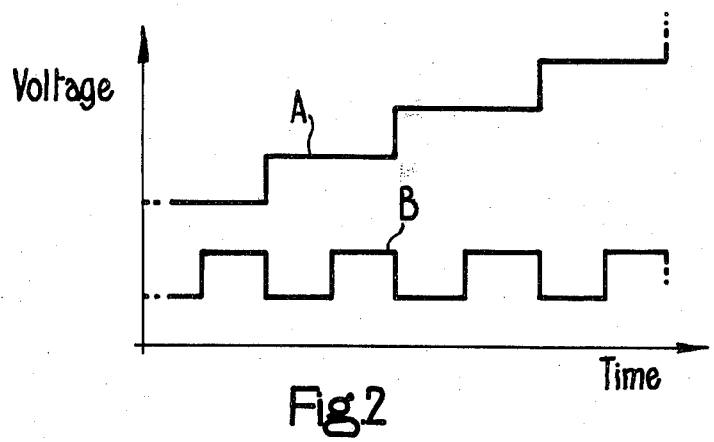

Embodiments of the present invention will now be described, by way of example, with reference to the drawing accompanying the provisional specification, in which:

FIG. 1 shows a schematic block diagram of the microscope according to the present invention, and FIG. 2 is a graph showing the waveforms of various voltages in the microscope of FIG. 1.

Referring to FIG. 1, the scanning electron microscope comprises an evacuated chamber (not shown) in which a specimen 12 can be mounted. An electron gun 14, comprising a field-emission electron source and suitable accelerating electrodes, (not shown), is mounted within the chamber and is arranged to produce a beam 16 of electrons directed towards the specimen 12. This beam 16 is focused to form a fine probe 18, by means of a magnetic objective lens 20, this probe illuminating a small region of the specimen 12. The probe 18 is scanned, in a predetermined raster pattern relative to the specimen, by means of "horizontal" and "vertical" deflection coils 22 and 23.

Referring now to FIG. 2, waveform A of this figure shows a portion of the scanning waveform applied to the horizontal deflection coils 22 during a single linescan of the raster pattern. This waveform is a step-like one, and therefore causes the probe to scan the specimen in a step-by-step manner, so as to illuminate a number of discrete spots in each linescan.

Referring back to FIG. 1, electrons from the probe 18 that are transmitted through the specimen 12 are collected by means of an electron detector 24, (e.g., a phosphor screen with a photomultiplier for detecting light from the screen) which produces an output signal proportional to the electron current received by it.

An auxiliary electrostatic or ferrite cored magnetic lens 26 is positioned between the objective lens 20 and the electron gun 14. The lens 26 is alternately activated and de-activated by means of a square-wave signal from a multivibrator circuit 28. When the lens 26 is de-activated, the probe 18 illuminates only a small spot of the specimen, as described above, but when lens 26 is activated, the probe is defocused, and illuminates a relatively extended area of the specimen. Ideally, the lens 26 defocuses the probe into an almost parallel beam, although in practice it is sufficient for the lens to defocus the probe so that it illuminates an area of the specimen which is large enough so that an average contrast value is obtained over the area. In a practical embodiment an area of illumination of the probe when defocused was equal to nine times the area of illumination of the focused probe.

Referring again to FIG. 2, waveform B in this figure shows the voltage applied to the auxiliary lens 26 as a function of time. The multivibrator 28 is synchronized with the scanning waveform applied to the deflection coil 22, so that the auxiliary lens passes through a complete cycle of focusing and defocusing during each step of the scanning waveform A, as shown in FIG. 2.

Referring once more to FIG. 1, the output of the detector 24 is applied to two gates 30 and 32. The first gate 30 is controlled by the above-mentioned square wave signal from the multivibrator 28 (waveform B), so that this gate is opened when the defocusing lens 26 is activated and is closed when the lens 26 is de-activated. The signal passed through this gate is therefore proportional to the electron current received by the detector 24 when the probe 18 is defocused, this current being proportional, to a very close approximation, to the total electron current of the probe 18. Thus, the signal from the gate 30 provides a reference signal which is substantially proportional to the probe current.

The other gate 32 is controlled by a second square-wave signal from the multivibrator 28, this second signal being the inverse of the first square-wave signal applied to the gate 30. Thus, the gate 32 is opened when the lens 26 is de-activated, and closed when the lens 26 is activated. The signal passed through this gate 32 is therefore proportional to the electron current received by the detector 24 when the probe is focused to a small spot, and therefore contains information concerning the structure of the region of the specimen illuminated by this spot.

The gates 30 and 32 include "sample-and-hold" networks (e.g., capacitors of low leakage rates) which maintain the signals at the outputs of the gates 30 and 32 during the periods when those gates are closed. Thus, the "focused" and "defocused" signals appear at the outputs of these gates concurrently.

The outputs from the gates 30 and 32 are fed, by way of respective amplifiers 31 and 33 to respective inputs of a differential amplifier 34. The gains of these two amplifiers 31 and 33 are so adjusted that, when the probe is focused on to a particular selected region of the specimen (typically, a region of the specimen corresponding to the "background"), the outputs from these two amplifiers are equal, and hence the output from the differential amplifier 34 is zero. As the specimen is scanned, the output from the amplifier 33 will vary according to the nature of the composition of the region of the specimen currently being scanned, and this will produce corresponding variations in the output of the differential amplifier 34. The signal from the differential amplifier is applied to the modulating electrode of a cathode ray tube 36, which is scanned in synchronism with the scanning of the probe in a similar raster pattern, thereby causing the tube 36 to display on its screen an image of the area of the specimen scanned by the probe. Variations in the total probe current will produce substantially equal variations in the outputs from the two amplifiers 31 and 33, and will therefore have substantially no effect on the output from the differential amplifier 34. Hence, the image displayed on the cathode ray tube 36 is substantially independent of variations in probe current. Viewed another way, the defocused signal from the amplifier 33 in effect provides a reference signal which is used by the differential amplifier 34 to compensate the focused signal from the amplifier 31 for variations in probe current.

In modifications of the arrangement shown in FIG. 1, the signals at the two inputs of the differential amplifier 34 can be adjusted by the following alternative methods, instead of by adjusting the gains of the amplifiers 31 and 33.

i. By altering the gain of the detector 24 between the focused and defocused conditions.

ii. By means of a potential divider arranged to reduced the value of the larger of the two inputs.

In another modification, the differential amplifier 34 could be replaced by a circuit arranged to divide the focused signal by the defocused signal, so as to give a resultant signal which represents the variations in transmission factor of the specimen, compensated so as to be independent of any variations in probe current. In this case, it is unnecessary to equalize the focused and unfocused signals.

Returning to the arrangement of FIG. 1, the gain of the differential amplifier 34 can be varied, so as to provide an adjustment of the contrast of the image displayed on the cathode ray tube 36.

In a practical electron microscope it was arranged that the auxiliary lens 26 could be switched off when the microscope is used at low magnification, since in this case variations of probe current can be averaged out by scanning the specimen a number of times to form a multi-frame image on the screen of the cathode ray tube. At high magnification, however, it is generally necessary to operate the microscope in a single-shot mode, scanning the specimen once only to form an image, in order to minimize the effect of mechanical drift on the resolution. Under these conditions, the auxiliary lens 26 would be operated as described above, to compensate for variations in the probe current. The alternate focusing and defocusing of the probe actually results in a small reduction in the signal-to-noise ratio of the microscope, by a factor of $1/\sqrt{2}$, but, in the case of specimens exhibiting low contrast and therefore requiring some form of electronic contrast expansion, this is outweighed by the improvement in the picture quality due to the elimination of the effects of variation in probe current.

In a modification of the arrangement described above, the probe may be scanned continuously instead of on a step-by-step basis, so that the waveform A in FIG. 2 would be replaced by a ramp-function waveform. The auxiliary lens 26 would, however, operate as before.

In another modification of the arrangement described, focusing and defocusing of the probe may be achieved by means of an auxiliary winding on the objective lens 20, instead of by the auxiliary lens 26. Alternatively focusing and defocusing may be effected by suitable electronic means which varies the excitation current to the objective lens 20, without the necessity for any auxiliary lenses or windings.

It should be appreciated that, although in the arrangement described above the focusing and defocusing of the probe is synchronized with the line scanning steps, this is not necessarily the case. For example, it could be synchronized instead to the frame scanning steps.

I claim:

1. A scanning electron microscope including an electron source for producing an electron probe directed towards a specimen; means for scanning said probe in a predetermined pattern relative to the specimen; detector means for collecting radiation issuing from said specimen as a result of scanning by said probe to produce an output signal representing the instantaneous magnitude of said radiation; means for alternately focusing and defocusing said probe to illuminate alternately a relatively small region of the specimen and a relatively extended region of the specimen, thereby causing said output signal to alternate between a focused value, which depends on the nature of the small region currently being scanned by the probe as well as on the total electron current of said probe, and a defocused value, which depends on the total electron current of said probe but is substantially independent of the scanning of said probe; and means for processing together successive focused and defocused values of said output signal so as to substantially compensate said focused value for variations in the total electron current of said probe.

2. A scanning electron microscope as claimed in claim 1 in which said relatively extended region of the specimen has an area equal to at least nine times the relatively small region of the specimen.

3. A scanning electron microscope as claimed in claim 1 in which said probe is scanned in a step-by-step manner over the specimen and in which the probe is focused and defocused at least once in each step.

4. A scanning electron microscope as claimed in claim 1 in which the means for alternatively focusing and defocusing said probe is a magnetic lens with a ferrite core.

5. A scanning electron microscope as claimed in claim 1 in which the means for processing together successive focused and defocused values of said output signal includes first and second gating means which are opened alternately at time intervals corresponding to the time intervals during which said probe is focused and defocused.

6. A scanning electron microscope as claimed in claim 5 in which the outputs of the first and second gating means are stored in respective first and second sample and hold circuits, in which the outputs of the first and second sample and hold circuits are amplified in respective first and second amplifiers and in which the outputs of the first and second amplifiers are connected to respective inputs of a differential amplifier, the output of the differential amplifier being connected to a modulating electrode of a cathode ray tube which is scanned to produce an image of the area of the specimen scanned by the probe.

7. A scanning electron microscope as claimed in claim 5 in which the outputs of the first and second gating means are stored in first and second sample and hold circuits, in which the outputs of the first and second sample and hold circuits are connected to the first and second inputs of a divider circuit, the output of the divider circuit being connected to a modulating electrode of a cathode ray tube which is scanned to produce an image of the area of the specimen scanned by the probe.

8. A scanning electron microscope as claimed in claim 2 in which said probe is scanned in a step-by-step manner over the specimen and in which the probe is focused and defocused at least once in each step.

9. A scanning electron microscope as claimed in claim 2 in which the means for alternately focusing and defocusing said probe is a magnetic lens with a ferrite core.

10. A scanning electron microscope as claimed in claim 3 in which the means for alternately focusing and defocusing said probe is a magnetic lens with a ferrite core.

11. A scanning electron microscope as claimed in claim 2 in which the means for processing together successive focused and defocused values of said output signals include first and second gating means which are open alternately at time intervals corresponding to the time intervals during which said probe is focused and defocused.

12. A scanning electron microscope as claimed in claim 3 in which the means for processing together successive focused and defocused values of said output signals include first and second gating means which are open alternately at time intervals corresponding to the time intervals during which said probe is focused and defocused.

13. A scanning electron microscope as claimed in claim 4 in which the means for processing together successive focused and defocused values of said output signals include first and second gating means which are open alternately at time intervals corresponding to the time intervals during which said probe is focused and defocused.

14. A scanning electron microscope as claimed in claim 11 in which the outputs of the first and second gating means are stored in respective first and second sample and hold circuits, in which the outputs of the first and second sample and hold circuits are amplified in respective first and second amplifiers and in which the outputs of the first and second amplifiers are connected to respective inputs of a differential amplifier, the output of the differential amplifier being connected to a modulating electrode of a cathode ray tube which is scanned to produce an image of the area of the specimen scanned by the probe.

15. A scanning electron microscope as claimed in claim 12 in which the outputs of the first and second gating means are stored in respective first and second sample and hold circuits, in which the outputs of the first and second sample and hold circuits are amplified in respective first and second amplifiers and in which the outputs of the first and second amplifiers are connected to respective inputs of a differential amplifier, the output of the differential amplifier being connected to a modulating electrode of a cathode ray tube which is scanned to produce an image of the area of the specimen scanned by the probe.

16. A scanning electron microscope as claimed in claim 13 in which the outputs of the first and second gating means are stored in respective first and second sample and hold circuits, in which the outputs of the first and second sample and hold circuits are amplified in respective first and second amplifiers and in which the outputs of the first and second amplifiers are connected to respective inputs of a differential amplifier, the output of the differential amplifier being connected to a modulating electrode of a cathode ray tube which is scanned to produce an image of the area of the specimen scanned by the probe.

17. A scanning electron microscope as claimed in claim 11 in which the outputs of the first and second gating means are stored in first and second sample and hold circuits, in which the outputs of the first and second sample and hold circuits are connected to the first and second inputs of a divider circuit, the output of the divider circuit being connected to a modulating electrode of a cathode ray tube which is scanned to produce an image of the area of the specimen scanned by the probe.

18. A scanning electron microscope as claimed in claim 12 in which the outputs of the first and second gating means are stored in first and second sample and hold circuits, in which the outputs of the first and second sample and hold circuits are connected to the first and second inputs of a divider circuit, the output of the divider circuit being connected to a modulating electrode of a cathode ray tube which is scanned to produce an image of the area of the specimen scanned by the probe.

19. A scanning electron microscope as claimed in claim 13 in which the outputs of the first and second gating means are stored in first and second sample and hold circuits, in which the outputs of the first and second sample and hold circuits are connected to the first and second inputs of a divider circuit, the output of the divider circuit being connected to a modulating electrode of a cathode ray tube which is scanned to produce an image of the area of the specimen scanned by the probe.

* * * * *